Patented Dec. 20, 1949

2,491,814

UNITED STATES PATENT OFFICE 2,491,814

PREPARATION OF CHOLIC AND DESOXY-CHOLIC ACIDS

Emil Kaiser, Chicago, Ill., assignor to Armour and Company, Chicago, Ill., a corporation of Illinois No Drawing. Application May 10, 1946, Serial No. 668,773

7 Claims. (Cl. 260—397.1)

This invention relates to the preparation of cholic and desoxycholic acids.

In the saponification of bile with strong alkalies to free bile acids, there is found to be a considerable darkening of the solution. The change in the bile pigments is unfavorable, not only because of troubles in decolorization during the steps of purification of cholic and desoxycholic acids, but also because of the tendency toward tar formation when these acids are precipitated from their alkaline solution. The forming of the dark decomposition products affects the purity and yield of the final product because of losses in the steps required to eliminate the decomposition products.

An object of the present invention is to provide steps in the treating process for inhibiting formation of the dark decomposition products, and further for producing a bile lighter in color than the original material. A further object is to provide a process for the preparation of cholic and desoxycholic acids wherein the yield and purity of the product are substantially increased. Yet another object is to provide in the saponification step, a material for inhibiting the formation of the dark decomposition products and for improving the quality and yield of the cholic and desoxycholic acid products. Yet another object is to provide a process whereby bile residues, such as alkaline bile residues, which are dark in color and extremely difficult to treat, are effectively processed for the recovery of high quality cholic and desoxycholic acid products. Other specific objects and advantages will appear as the specification proceeds.

Broadly, my process comprises treating bile, or a residue, or other fraction thereof, with a water-soluble hydrosulfite salt, preferably in combination with a strong alkali and at elevated temperatures, then cooling, and filtering the solution to produce salts of free bile acids. The elevated temperature may be any temperature higher than room temperature, but for better results should be above 50° C. Suitably I may use temperatures of about 100° C. or in the neighborhood of boiling. The solution may be acidified with hydrochloric acid, or other suitable acid, to form a precipitate to produce the crude acid product.

The crude acid product may be treated by known steps to produce cholic acid and desoxycholic acid with high yield of a product of high purity.

The desoxycholic acid preparation may be well accomplished after the hydrosulfite treatment by precipitating it as barium salt from ammonium solution. The accumulated bile residues, which are extremely difficult to process, have been very effectively treated through the combined hydrosulfite and barium chloride steps. I find that final purification in acetone is highly effective in producing the final desoxycholic acid of high purity.

Example I

For the preparation of bile acids inspissated bile was used, the total solids of which were 67.6%, cholic acid (in colorimetric test) 53.4% of the total solids. 1145 grams of the inspissated bile were dissolved in enough water to make 7750 cc. 775 grams sodium hydroxide (10%) and 388 grams sodium hydrosulfite (5%) were added and the solution refluxed for 17 hours. Then the solution was cooled, filtered, a mixture of 77 cc. hexanol (1%) and 2225 cc. benzol (30%) added and, while stirring, the water layer was acidified with hydrochloric acid 1:1. The precipitate was filtered off, washed with water and benzol, dried on the air. Yield—553 grams crude cholic acid.

500 grams of the crude cholic acid were stirred with 500 grams of alcohol for one-half hour, then filtered, washed with alcohol on the filter. The residue was stirred with 250 grams of alcohol one-half hour, then filtered again and dried on air. 322 grams (10% alcohol). M. P. 191–194° C., 98.6% of the solids acid, 97.6% cholic acid.

The alcohol extracts were combined and distilled. When the residue was about 400 cc., 100 cc. of a 20% sodium hydroxide solution were added and the distillation continued. Occasionally some water was added to keep the volume 300–400 cc. and the distillation continued. When most of the alcohol was distilled off, the residue was diluted to 2 liters with water and acidified with hydrochloric acid 1:1. A granular precipitate came down, which was filtered off and washed on the filter. The precipitate was dried in vacuum without heat. Yield: 154 grams crude cholic and desoxycholic acid mixture.

150 grams of this crude acid mixture were dissolved in 1000 cc. water with 70 cc. concentrated ammonia solution. 70 grams $BaCl_2.2H_2O$ were dissolved in 700 cc. water, the cholate and the barium chloride solution heated to 45° C. and the barium chloride solution poured into the cholate solution while strongly agitated. The mixture was kept in cold over night, and the barium desoxycholate did precipitate. It was filtered off, washed with water, dried on air. Yield 65 grams barium desoxycholate.

The filtrate of the barium desoxycholate was acidified, the precipitate filtered off, washed with water, dried in vacuum without heat. Yield 75 grams crude cholic acid.

The barium desoxycholate was heated on steam bath with 1000 cc. 5% sodium carbonate solution. After the decomposition was finished (fine, white precipitate), the barium carbonate was filtered off, washed with water and the filtrate acidified. The desoxycholic acid was separated by filtration, dissolved again in 1000 cc. water and 30 cc. conc. ammonia and at 45° C. a solution of 20 gms. barium chloride in 800 cc. water was added. Over night the barium desoxycholate fell out and was decomposed as above. The desoxycholic acid was once more purified through the barium salt and dried in vacuum without heat. Yield 31 gms. crude desoxycholic acid.

The desoxycholic acid, after the third barium purification, was dissolved in four parts acetone and crystallized in cold. The acetone of crystallization can be removed by heating the desoxycholic acid (crystallized from acetone) in water. After filtration and drying, the melting point was 171° C. and yield was 27 grams.

Example II

Two liters alkaline bile residue were refluxed with 100 gms. sodium hydrosulfite for one hour, then cooled and filtered. The filtrate was diluted to four liters and acidified with hydrochloric acid 1:1. The precipitate was filtered off, washed and dried. Yield was 222 gms. Desoxycholic acid (colorimetric assay) about 70%.

90 gms. of crude desoxycholic acid (92.5% total acid, 35% cholic acid of the total) were dissolved in 1800 cc. water by adding 27 cc. concentrated ammonia solution. The solution was heated to about 95° C. and 27 gms. $BaCl_2, 2H_2O$ in 1800 cc. water of 45° C. were slowly poured in. Left two days at room temperature, barium desoxycholate was precipitated. The precipitate was filtered off, washed three times with water, dried on air, and 50 gms. barium salt were obtained. From the mother liquor of barium salt, crude cholic acid was precipitated with 1:1 HCl. Dried on air, this crude cholic acid had a weight of 51.5 grams. Analysis results: Total acid, 97.6%; cholic acid, 64.5%.

Decomposition of the barium salt: The barium salt was added in one liter 5% $Na_2CO_3$ solution and, under occasional stirring, kept for one hour on steam bath. Kept over night at room temperature, the $BaCO_3$ settled down and was filtered off and washed with water. The filtrate was cautiously acidified with 1:2 HCl and the precipitate filtered off. The well-washed precipitate was mixed into 1200 cc. water and dissolved by adding 18 cc. concentrated ammonia solution to the water. The solution was heated to 45° C. and 1200 cc. of a barium chloride solution (18 gms. Ba-chloride) of 45° C. was slowly added. After staying over night at room temperature, the Ba-desoxycholate was filtered off and washed three times with water. Acidification of the filtrate yielded 2.1 grams cholic acid-desoxycholic acid mixture.

The barium salt was treated for one hour in a steam bath with 1000 cc. 5% $Na_2CO_3$ solution, the $BaCO_3$ filtered off and the filtrate acidified. The desoxycholic acid was filtered, well-washed and dried on air, then dissolved in about 200 cc. methanol (hot), some charcoal added, filtered and the filter washed with hot methanol. The methanol solution was poured into 1 liter hot distilled water and kept on steam bath for 1½ hours. The thick, white precipitate was filtered off, washed with water, dried in vacuum at 80° C. 31 gms. white powder, melting point 167–170° C., ash below .1%, no cholic acid in colorimetric test.

For further purification, 25 gms. of this desoxycholic acid were dissolved in 500 cc. water with 10 cc. ammonia. At about 45° C., 8 gms. $BaCl_2, 2H_2O$ dissolved in 500 cc. water 45° C. were added, and then kept in cold room over night. The barium salt was filtered off, washed and the filtrate acidified. 1.1 gm. desoxycholic acid came out from the filtrate. The barium salt was decomposed with 800 cc. 5% $Na_2CO_3$, the $BaCO_3$ filtered off, washed and the filtrate acidified with HCl 1:2. The desoxycholic acid was filtered off, four times washed, dissolved in about 250 cc. methanol and the hot methanol solution poured in 1 liter hot water. After one hour on steam bath, the desoxycholic acid was filtered off and washed in water. After drying in vacuum, the yield was: 22 gms., melting point 172–173° C.

In each of the foregoing examples, it will be noted that the use of a water-soluble hydrosulfite salt is very effective in producing a crude product which is free of dark decomposition products and which may then be readily handled for the recovery of the desired cholic and desoxycholic acid products with good yields and a high grade of purity. Sodium or potassium hydrosulfite or any water-soluble hydrosulfite salt is satisfactory. I have found that sodium hydrosulfite is unusually effective in producing the above described results.

Any strong alkali may be used along with the hydrosulfite salt, as, for example, sodium or potassium hydroxide. I have found that sodium hydroxide is very highly effective with the water-soluble hydrosulfite salt in producing the lighter colored product from which the desired acids are effectively obtained.

While in the foregoing specification I have set forth specific steps in the description and in the examples as a means for illustrating the invention, it will be understood that such steps and specific reagents may be varied by those skilled in the art for accomplishing the same purpose and without departing from the spirit of my invention.

I claim:

1. In the preparation of cholic and desoxycholic acids from bile, the steps of mixing bile with a water-soluble hydrosulfite salt, and heating the mixture together with a strong alkali.

2. In the preparation of cholic and desoxycholic acids from bile, the steps of mixing bile with a water-soluble hydrosulfite salt, heating the mixture together with a strong alkali, and cooling and filtering the mixture to recover the salts of free bile acids.

3. In the preparation of cholic and desoxycholic acids from bile, the steps of mixing the bile with a water-soluble hydrosulfite salt, heating the mixture together with a strong alkali, cooling, and acidifying the mixture to form a crude acid precipitate.

4. In the preparation of cholic and desoxycholic acids from bile, the steps of mixing the bile with a water-soluble hydrosulfite salt, heating the mixture together with a strong alkali, cooling, acidifying the mixture with hydrochloric acid to form a crude acid precipitate, and separating from the mixture the crude acid precipitate.

5. In the preparation of cholic and desoxycholic acids from bile, the steps of mixing the bile with a water-soluble hydrosulfite salt and sodium hydroxide, and heating the mixture.

6. In the preparation of cholic and desoxycholic acids from bile, the steps of heating the bile with a water-soluble hydrosulfite salt and sodium hydroxide, cooling, acidifying the mixture with hydrochloric acid to form a precipitate, and filtering to recover the precipitate.

7. In a process for treating bile acid residues, the steps of mixing said residues with a water-soluble hydrosulfite salt and a strong alkali, heating the mixture, cooling, filtering, acidifying the water layer recovered with hydrochloric acid to form a crude acid precipitate, and separating the precipitate.

EMIL KAISER.

REFERENCES CITED

The following references are of record in the file of this patent:

UNITED STATES PATENTS

| Number | Name | Date |
| --- | --- | --- |
| 1,861,319 | Peyer | May 31, 1932 |